(12) United States Patent
Ruben et al.

(10) Patent No.: US 7,143,048 B1
(45) Date of Patent: Nov. 28, 2006

(54) SYSTEM AND METHOD FOR MANAGING REAL ESTATE

(76) Inventors: Richard Ruben, 130 Lincoln Ave., Purchase, NY (US) 10577; Gilles Queru, 14946 Rancho Antiguo, Del Mar, CA (US) 92014; Eric Monteil, 115 Fey Dr., Burlingame, CA (US) 94010

( * ) Notice: Subject to any disclaimer, the term of this patent is extended or adjusted under 35 U.S.C. 154(b) by 262 days.

(21) Appl. No.: 09/704,322

(22) Filed: Nov. 2, 2000

Related U.S. Application Data (60) Provisional application No. 60/221,652, filed on Jul. 28, 2000.

(51) Int. Cl.
*G06F 17/60* (2006.01)
(52) U.S. Cl. .................... 705/1; 705/12; 705/7
(58) Field of Classification Search .............. 705/1, 705/12, 7
See application file for complete search history.

(56) References Cited

U.S. PATENT DOCUMENTS

| | | | | |
|---|---|---|---|---|
| 4,799,156 | A * | 1/1989 | Shavit et al. ................. | 705/26 |
| 5,933,816 | A * | 8/1999 | Zeanah et al. ................ | 705/35 |
| 6,334,107 | B1 * | 12/2001 | Gale et al. .................... | 705/10 |
| 6,993,576 | B1 * | 1/2006 | Labedz et al. ............... | 709/223 |
| 2001/0025250 | A1 * | 9/2001 | Gale et al. .................... | 705/10 |
| 2001/0037273 | A1 * | 11/2001 | Greenlee, Jr. ................ | 705/35 |
| 2002/0002579 | A1 * | 1/2002 | Holden et al. ............... | 709/200 |

FOREIGN PATENT DOCUMENTS

JP 09114882 A * 5/1997

OTHER PUBLICATIONS

How To: Bind to XML Data with Internet Explorer, Jul. 12, 2000, Last Reviewed Jul. 15, 2002.*
Information on IBM, 1995-2000, printed through www.archive.org.*
Information on Yardi Systems, Inc., 1996-1999, printed through www.archive.org.*
Information on HomeGain.com, 1999-2000, printed through www.archive.org.*
Information on BuildingLink.com, 2000.*

(Continued)

*Primary Examiner*—Naresh Vig
(74) *Attorney, Agent, or Firm*—Darby & Darby (57) ABSTRACT

A method of managing a real estate property on which the lease parameters of the property are established in a computer database and a computer data file of the database contains at least one user profile related to management of the property. An assignment is made in the data file of the attributes of the authority of the user relative to the management of the property. The database contains data as to each of an owner entity of the property, a property manager entity of the property, if applicable, at least one tenant entity that occupies space in the property, and one or more vendor entities that are to provide services to the property. A user profile is set for at least one user of at each of the owner entity, property manager entity, if applicable, tenant entity, and vendor entity, and at least one attribute of authority is assigned to each said user. Communication capability is provided, preferably over the Internet, between the users of the owner entity, property manager entity, if applicable, tenant entity and vendor entity to manage an provide services for the property. Each property is assigned a domain name and a property owner can manage and obtain information for one or more properties that it owns.

26 Claims, 4 Drawing Sheets

OTHER PUBLICATIONS

Information on BJM Central, May 10, 1999.*
Examples of Using MQSeries on S/390, RISC System/6000, AS/400 and PS/2, Jun. 1994, IBM Corporatoin.*

Information on IRIS, May 11, 1999.*
Trina Fletcher-McDonald, Test Center Comparison, Jul. 19, 1999, InfoWorld.*

* cited by examiner

SYSTEM AND METHOD FOR MANAGING REAL ESTATE

RELATED APPLICATION

This application is based on a Provisional Application Ser. No. 60,221,652 filed on Jul. 28, 2000 and is incorporated herein by reference.

FIELD OF THE INVENTION

The present invention relates to a workflow system and method to help organize, automate and facilitate management processes and communications for owners and managers of real estate properties, including, without limitation, commercial office buildings. The system and method are useful for property owners, property managers/building staff, tenant office managers, and vendors who provide services to the property. In the system and method, communications preferably are carried out over the Internet (world wide web).

BACKGROUND OF THE INVENTION

Management of commercial real estate, such as apartment complexes, commercial office buildings, malls and other similar facilities, is a complex task. Property owner tasks, in addition to satisfying tenant needs, include managing building space inventory and tracking lease provisions. Satisfying the needs of tenants includes dealing with various vendors to make repairs and maintaining the property premises. Such repairs and maintenance range from emergencies to relatively mundane tasks like assigning and monitoring cleaning responsibilities and making repairs (e.g. changing a light bulb).

Heretofore, property management has been performed largely on a manual basis by the owner/landlord of a property or a management company employed by the owner. For example, if an employee of a tenant working in a room of a leased office space decides that s/he wants a repair, that person often directly calls the landlord or property manager for the repair. The employee also might call a vendor directly. Such calls are sometimes done without the approval of the person at the tenant with the authority to approve such repairs. These unauthorized calls result in wasted effort and a possible dispute over the responsibility for repair costs between the landlord and tenant. This could also result in costs to the landlord in making unnecessary repairs.

Problems also can arise in carrying out a repair assignment. For example, some buildings maintain and pay for their own repair personnel while others hire outside contractors or vendors to perform the work. In either case, the landlord property owner would like to effect the repair in the most efficient manner at the lowest cost by either utilizing its own personnel or hiring outside contractors on the most cost efficient basis.

Management problems become even more complex where the landlord property owner owns a number of properties in the same city or town or in different cities, states or countries. In such cases, the owner may wish to control or monitor, directly or through a property manager, management of some or all of the properties from a central location. This would provide the owner with more complete information as to the status of its properties and better control over management and costs.

Heretofore, no system has existed that provided a property owner or property manager with the capability to carry out the necessary management functions on a comprehensive basis using computer aided resources. In particular, a need exists to enable the property owner or property manager to integrate the management and information pool relating to a number of properties at various locations for analysis purposes.

BRIEF DESCRIPTION OF THE INVENTION

The present invention provides a system and method for managing real estate properties. The system includes a relatively simple and intuitive computer user interface enabling enhancement of the workflow and communication processes among owners, property management, tenants, and vendors associated with a single real estate property or group of related properties. The invention also provides a secure and scalable application available from any Internet accessible device (e.g., computer or telephone) that allows for different levels of customization and personalization.

In accordance with the invention, a property is assigned an identity, preferably an Internet domain name. Entity profiles are established for the property owner, the property manager, tenants of the property and vendors who are to service the property. Certain information is entered for each entity, including names, addresses and contact persons. User profiles are then established for each user of the system. The profiles include contact information about the user as well as assigned attributes, which are privileges or limits of authority granted to users of the system. Attributes manifest themselves in the system as (1) functions users can perform within the system and (2) information, usually in computer page form, that each of the users can view within the system.

The users of the various entities related to a property communicate and interact with each other, preferably via the Internet. For example, the office manager of a tenant entity can communicate directly with a vendor entity to establish a service request, such as a repair. As a feature of the invention, the request is considered to be valid only if it is within the limit of the user's authority attribute. Additionally, a user of a property owner or property manager entity also can make such requests of a vendor. Regardless of the source of the request, the system is able to track the fulfillment of the request.

The system can operate with a number of properties so that a property owner or property manager of a number of buildings at various locations can effect management of the building and acquire and assemble data related to the properties. Such data and the reports generated by such data will in turn provide property owners and property managers with information to more effectively and more profitably manage its properties.

OBJECTS OF THE INVENTION

An object of the invention is to provide a method and system to automate the management of one or more real estate properties.

Another object is to provide a method and system for management of one or more properties by which property owners, property managers, tenants and vendors can communicate and interact with each other to effectuate property management and maintenance.

A further object is to provide a method and system by which a tenant in a property, a property owner or manager can initiate service requests up to authorized limits on the basis of a user profile that has assigned limits of authority.

Yet another object is to provide a method and system in which a property owner or property manager, tenants of the property and vendors interact via computer based data and electronic communications, preferably over the Internet, to manage one or more properties.

BRIEF DESCRIPTION OF THE DRAWINGS

Other objects and advantages of the present invention will become more apparent upon reference to the following specification and annexed drawings in which.

DETAILED DESCRIPTION OF THE INVENTION

The method and system of the invention includes performance of a number of functions using a computer. The computer can be of any conventional type and of the requisite capacity using a conventional storage and data processing technique. Each user of the system has access to a computer terminal having the usual display and keyboard. Data can be stored in a convenient location, either locally at a property from which it can be accessed or at a location remote from a property. Certain users of the system can enter data, view data and access data as described below.

The functions of the method and system are grouped into logical modules and are discussed below.

I. Administration Module—This includes the functions to set up and maintain properties, entities (property owner, property manager, tenants, and vendors) and users (employees of the entities). There are a number of sub-modules and these and the functions referred to are defined below. The module also includes processes for a system user sign in and uploading and management of property site content. This is shown in the flow chart diagram of FIG. 1, which effectively is an application program for the system computer.

A. Type of Documents

The administration module of the system uses both static documents and interactive information.

Static Documents are electronic documents that are not modifiable directly in the system, but can be created or updated directly in their native applications. Any pertinent hard copy documents can be converted to electronic format, and stored in the system in standard computer format and as PDF, MS Word, or any other applicable format. Users will be able to access various static documents for viewing, and uploading new or edited versions, depending on their User Role Category.

The static documents processed by the system include, for example, contracts and a list of policies and procedures relating to a building. Contracts would include leases, vendor contracts and policies and procedures would include construction rules and regulations, emergency procedures, tenant office policies and procedures, and cleaning specifications. Other static documents would include employee directories, drawings of tenant space, preferably in CAD (computer aided design format), contact lists, and life safety designations. Other similar types of static documents also can be added to the system. The information for the documents preferably is developed on a building specific and building tenant space basis. The tenant space can range from one room or suite to multiple floors of the building or even the entire building.

Interactive Information is generally presented in form documents that contain active fields for entry of data. Such documents are hereafter referred to as interactive documents. The data from these documents may be used in the system processes on an active basis and can be edited. Interactive information processed by the system would include, for example, lease abstracts, vendor service contract abstracts, property management abstracts, insurance certificates, building directories, employee directories, and stacking plan data.

Key data fields are captured during entity profile and user profile setup in the Administration module. This process is described below. The data is associated to property entities within the system and is accessible based on the user entity role level, as explained below. Data contained in these fields is used to direct and provide information to service request workflows and other parts of the system, e.g., pre-populating fields and choices to help simplify the user's use of the system.

The computer also is capable of standard reporting functions to capture and summarize current and historical data from the system.

The interactive information also may contain values to be used in fee/accounting calculations. It is in a form such that it can be analyzed and categorized for use in reports, preferably by well known computer database techniques, such as SQL (structured query language), sorting, etc.

In summary, the data processing portion of the system provides the capabilities to:
Create Interactive Information
Upload Static Documents
Document Viewing/Printing/Searching
Document Updating/Editing/Detaching
Update/Edit Interactive Information
Upload (updated) Static Documents
Deactivate Interactive Information
Unload Static documents
Archive Old Documents (interactive and static)

All of the above are accomplished in a standard computer manner, such as by an operator entering data on a display screen, storing entered data on a hard disk locally or remotely and printing out hard copy reports.

II. Initial Entry Set Up—

As shown in FIG. 1, the system is started in S101. There is a sign-on step S103; a welcome screen in S105, and the user selects a function to execute in S107. Set up or maintenance of an entity or user profile is done in S109. First to be described is the set up of a property profile.

Certain data is entered into the system relative to a particular property. A property represents the physical location of any type of property, such as a commercial office building, apartment house, shopping mall, etc. Associated with a particular property are entities generally comprising the property owner, property manager, one or more tenants, one or more contractors and vendors. A profile is to be set up for each of these entity categories, as selected in S113. The appropriate screen is displayed for entry of the data on the selected category.

The actions required to implement the invention include ascertaining and entering the following data as an interactive data document. The set up module generates computer data records and includes the following aspects and functions:

A. Property Profile

To establish a profile for a property that is to use the system, the following steps are followed in S120:

1. Create a domain for each property location. A property is basically defined as a single building, apartment complex, or mall. Here, each property is assigned a domain name that can be implemented for bi-directional communication over the Internet or by some other suitable communication medium. This preferably is done in standard Internet format, e.g., 600 mad.com.

2. Create the property profile. Information is entered into a database that is specific to the property. This data includes, for example, the number of floors, suites and associated square footage of a property. This type of property profile information can be associated with static documents such as drawings of the offices, floors, etc., which also are stored in and available from the computer database.

An important concept to creating a property profile is the concept of "space". Space is an object that represents the areas of a property accessible to the various entities interacting with a property. A space can be one or more suites, floors, elevators, common conference rooms, gyms, laboratories, loading docks, bathrooms, hallways, lobbies, etc. The space concept is used to direct service request workflow described below, and to assign management and ownership responsibilities to the various property management and ownership entities related to the property. Information on each space in the building can be placed on a static or interactive document.

Another important concept relating to a property is the concept of "lease". A lease represents a section of space within a property. A space is typically defined by building floor(s) and associated suite(s). The lease can define, for example, one suite of rooms on a floor of a building, several floors, suites on different floors, etc. The lease contains the terms of the space such as rental rate and square footage. The lease and its associated space is contracted to one tenant entity. That is, a tenant entity is a data record of the person or company that is responsible for the lease and the space related to it. A lease may have sub-tenant entities associated as well. That is, the original tenant may have subleased the space. Depending upon the business arrangement, one or both of the original tenant or sublease tenant can be responsible for the leased space. All of this data is entered on interactive documents.

The property profile also contains information about its owner, management, tenants, vendors and operations. Some of the information is "public" and accessible to anyone who visits the website for the property. For example, potential tenants can view the "public" information. Other information is "private" and accessible only to authorized users who sign into the system and have the appropriate User Role Category.

B. Create Entity Profiles/Assign Entity Role Categories.

After the property profile has been set up, in S130, entity profiles are created by assigning Entity Role Categories to the entities that are associated with the particular property. An Entity Role Category represents a type of entity that interacts with a property. Entity Roles are important because User Role Categories are organized by entity and thus information is associated and categorized within the system based on the entity profile of a user. For example, users of a Property Ownership entity (Property Owner Role) will have only those User Role Categories that pertain to a property owner entity available to them. This is described below.

In the illustrative embodiment of the invention described, the system supports six different types of Entity Roles. Fewer or more Entity Roles can be used. The entity Roles are: system administrator, property owner, property management, tenant, vendor and outside. Once an Entity Role Category is assigned to each entity associated with a particular property, additional information is entered creating a personalized entity profile for each entity. A more detailed description of the exemplary different Entity Role Categories is described below.

a. System Administrator. This is defined as the entity that administers the system for a particular property.

b. Property Owner. This is defined as the managing ownership company of the property. Typically, multiple individuals and companies own a property and set up a managing ownership company to own the property in its name. Data (name, address and contact personnel) is entered via the user interface and stored in the system's database. This data can in turn be used to generate interactive documents.

When using the system, property owners are interested in aggregated information for their building(s) and any impact on operating costs and revenues. Therefore, their view in the system is primarily focused on summarized information within the service request and reporting modules, both of which are described below.

c. Property Manager. The manager can be the property owner. In some cases, however, a property is not directly managed by the owner but is managed by a professional management person or company. Here, the identity of and information relating to the property manager is entered. The manager entity profile data entry on an interactive document includes specific information about the manager, such as, details of personnel, contact points, etc. It should be noted that the property owner will still have access to the Internet domain from his property, even if managed by a separate property manager.

Property management staff is more focused on using the system as an integral tool to manage the property. Consequently, the information required by a property manager relates to the service request, communication, administration, building information and reporting modules.

Entities that represent property ownership and property management may have more than one property operating under the system. The system can associate property location(s) to a property owner and property management entity profile. An association between these entities and each relevant location is made in the system to facilitate access to multiple properties. The system application program is structured to minimize redundancy of entry of property owner and property manager entity profile information and the process of entity profile set up where multiple properties are involved. That is, information that is common to a plurality of properties is applied to all of the properties by one entry. Association of properties by the system permits the owner of multiple properties the ability to easily view information concerning all of his properties participating in the system.

d. Tenant. A tenant is an entity that leases a space in the property. Here also, information on the name of the tenant and other relevant data, such as address and primary contact, is entered as data on an interactive document.

e. Vendor. A vendor is a person or company who provides services to the building. These can be, for example, plumbers, electricians, cleaners, etc. The name, address and contact person of each is entered as data on interactive documents.

f. Outside. A outside entity is a person or company who supports, interacts or is somehow associated with the other entities who directly interact with the property. Outside entities are of interest to distinguish and track, but do not have users associated with the system. These entities can be, for example, insurance companies that provide coverage to vendors or guarantors that provide guarantees of rent for tenants. The name, address and contact person of each is entered as data on interactive documents.

In FIG. 1, the completion of the set-up of the entities is represented by S132.

Table 1 below is an overview of the different Entity Role Categories supported in the system with an example for each Role.

TABLE 1

| Entity Role Category | Example |
| --- | --- |
| System Administration | Workspeed Inc. |
| Property Owner | Lawrence Ruben, Shorenstein |
| Property Management | XYZ Management Co. |
| Tenant | Partech, ABC Consulting, BankAmerica |
| Vendor | Bay City Cleaning Services |
| Outside | National Guarantor Bank, Prudential Insurance |

III. User Setup Module

A. Creating User Profiles

After the property has been setup, user profiles are created by assigning User Role Categories to the employees (users) of each entity associated with that particular property. The User Profile Set Up Process in S140 of FIG. 1 includes identifying the user, assigning a User Role Category to a user and describing the lease and space.

Each User Role Category primarily represents a group of attributes. As stated earlier, attributes are privileges or limits of authority granted to users of the system and manifest themselves in the system as (1) functions users can perform within the system and (2) pages that users can view within the system. A number of attributes available to users of the system are described below. Other attributes can be designated and assigned.

The incorporation of User Role Categories enables the system to drive the workflow processes and other forms of interaction and maintenance of the system, differently for users within the same Entity Role Category. For example, there is a difference in authority and user needs between a leasing agent of a property who is employed by the property manager of a property and the Chief Engineer of the property. Both of these users are categorized as users in the Property Management Entity Role, and in this example they could work for the same Property Management entity. Within the system these users have different needs and functions to perform. When each user's profile is created, a User Role Category is assigned. The User Role Category can be, for example, an office manager of a tenant who has responsibility for requesting service from one or more vendors, a user of an owner who can request information from the system and can interface with a property manager and tenants.

Users are associated to an entity and an entity may be assigned multiple Entity Role Categories. For each entity role that an entity has, users of such entity may have a corresponding User Role Category. For example: John Smith is a user for the Property Ownership entity of Smith Inc. Smith Inc. owns the property at 600 Madison and is also a tenant of the property at 600 Madison. John Smith (user profile) also is associated to the tenant entity (Smith Inc.). For each of his roles for the two entity roles (Property Owner and Tenant), John Smith has an associated User Role Category (i.e., a property owner User Role Category and a tenant User Role Category).

Table 2 below provides an illustration of the User Role Categories for the various Entity Roles within a property illustratively called 600 Mad. This diagram is an example. Once all the functionality associated with the system has been fully designed, the User Role Categories are assigned sets of attributes.

In Table 2, UR means "user role" and the sequence of users for these roles is UR-1, UR-2, etc. The abbreviation for the property owner, property manager, tenant and vendor are "Own", "Prop.Mgt.", "Ten" and "Ven". In Table 2 the guarantor of a lease is identified as "Out" and also has a user.

TABLE 2

| Role | Example of Entity | User Role Category | Example: Description of user Role Category |
| --- | --- | --- | --- |
| Tenant | Benjamin's | 600Mad_Ten_UR_1 | Office Manager |
| | | 600Mad_Ten_UR_2 | Office Manager Asst |
| | | 600Mad_Ten_UR_3 | Tenant Employee |
| Property Owner | Lawrence Ruben | 600Mad_Own_UR_1 | Primary Owner Representative |
| | | 600Mad_Own_UR_2 | Secondary Owner Representative |
| Property Management | XYZ Management | 600Mad_Prop_Mgt_UR_1 | Primary Property Manager |
| | | 600Mad_Prop_Mgt_UR_2 | Property Mgmt. Assistant |
| | | 600Mad_Prop_Mgt_UR_3 | Chief Engineer |
| Vendor | Corporate Cleaning Company | 600Mad_Ven_UR_1 | Manager |
| | | 600Mad_Ven_UR_2 | Employee |
| Outside | National Guarantor Bank | 600Mad_Out_UR_1 | Guarantor |

If necessary, User Role Categories for a particular property or for a particular entity can be customized. Additionally, a user's personalized user profile that has been assigned a particular User Role Category can be customized by adding or deleting any or all of the specific attributes listed on Exhibit A. Once created, users may sign in to use the system in S103 with an identification name and a password.

Users can perform various functions pertaining to their User Role Category supported in the system. For example, ABC Consulting (tenant entity) leases office space in the property (600 Madison). Cindy is the office manager of ABC Consulting and has been assigned the 600 Mad_Ten_UR_1 tenant User Role Category. Cindy will be able to sign into the system and perform the functions associated with that User Role Category. This is described below in Section B.

In some cases, user profiles are first established for one primary user (or a small group of primary users) and such primary user will in turn create user profiles for his/her staff. Similar to above, the primary user can select a User Role Category for each user and add or delete attributes (depending on such user's authority) as necessary to customize such person's user profile. This is shown in S142.

Finally, the system administrator or perhaps the primary user at a property may implement the processes for uploading and managing new content to the system used at a property site. These functions involve implementing updates to the configuration of the system, shown in FIG. 1, steps 160–170 and include:

Create New Entity Profile

Create New User Profile

Update/Edit an Existing Property Profile

Update/Edit an Existing Entity Profile

Update/Edit an Existing User Profile
View an Existing Property Profile
View an Existing Entity Profile
View an Existing User Profile
Deactivate Property Profile
Deactivate Entity Profile
Deactivate User Profile B. Attribute Relationships and User Role Categories As described above, User Role Categories are defined and configured during the initial set-up process, based on the property and type of entity, along with the authorization rules. Each authorized user of the system is assigned a User Role Category. The User Role Category has a set of attributes mapped to it, that define the capabilities a given user in a category can perform. For example, a property manager entity user would have attributes such as lease_create (create a lease document)
lease_activate (activate the lease document)
announcement_create (create an announcement The system administration for principal user can change attributes, such as document_property_create (create a property document)
document_property_edit (edit the document)

The list of attributes is tailored to each function to be performed.

In general, each user in the system is assigned one or more attributes, depending upon the responsibilities that he/she is to have with respect to interacting with the system.

Consider as an example where a user of a tenant is to be responsible for creating and sending a service request to Property Management. This is a process or a series of activities (including creating and authorizing the request) that need to be completed. In the example, an attribute for the tenant User Role Categories is "Authorize Service Requests less than $1000.00". For a tenant to authorize service request that cost less than $1000.00, they will need to have this attribute. In other words, the execution of each activity or process in the system requires that a user's User Role Category contain the particular attributes related to that activity.

Each attribute has a name and a value. In the example above, the attribute name is "Authorize Service Request Below a Certain Cost Value", and it's value is "<$1000.00". During the installation of the system at a property, the system administrator doing the installation will define the entire list of attributes for the system to be used at a property, and assign them to the various User Role Categories as determined by the needs, responsibilities, and abilities of users in the entity categories. In turn, these attributes will define the user interface experience and system functions that the user is allowed to execute.

Each user of the system is given an identification (ID). Such user's personalized user profile corresponds to the user ID. During sign in/validation of the user ID, all the User Role Categories (as well as any added/deleted attributes) associated with that user profile are returned and displayed. Such user profile presents the user with the attributes available to him/her during his session of use.

EXAMPLE 1

Cindy is the tenant office manager for ABC Consulting, a tenant at the property 600 Madison. The Entity Role Category for Cindy is Tenant, and her User Role Category is 600 Mad_Ten_UR_1, showing that she is the tenant office manager. One of Cindy's responsibilities is approving service requests initiated by tenant employees of ABC. Cindy is authorized to approve service requests that cost up to $1000.00. In order to accomplish this task, the "Authorize Service Requests less than $1000.00" attribute is mapped to her User Role Profile (600 Mad_Ten_UR_1). If an employee of ABC asks Cindy to have a repair made, Cindy can use the system and make the request to a vendor, described below, so long as the request is for less than $1,000.

There can be customization of the attributes for the various users at the property level, the entity level and/or at the user level. If a user that belongs to a certain User Role Category at a specific property location or at a certain entity, or if a specific user on the system at a specific property location, requires specialized attributes, the administrator team installing or a principal user administering the system will be able customize the attribute set mapped to (a) the User Role Category (if at the property or entity level) or (b) such user's personalized user profile (if at the user level)

EXAMPLE 2

From research performed for a specific property, it has been determined that a reasonable value for the "Authorize Service Requests Below a Certain Cost Value" attribute, for the tenant office managers User Role Category (Ten$_{13}$ User-Role_A), is $1000.00. However, during the implementation at 600 Madison, it is discovered that all tenant office managers at this property need the ability to approve service requests that cost up to $2000.00. To meet this requirement, the system administrator or owner/property manager principal user modifies the set of attributes for tenant office managers at 600 Madison (property profile level). Specifically, the system administrator or principal use system administrator or principal user would change the "Authorize Service Request Below a Certain Cost Value" attribute value to "<$2000.00". Since the User Role set of attributes for tenant office managers at 600 Madison has been modified, the original set of attributes defined for the general tenant office manager User Role Category for each entity at 600 Madison will be overridden.

In an extension of the above example, it is discovered that all tenant office managers of a particular entity need the ability to authorize service requests that cost up to $2,500.00. To meet this requirement, the owner/property manager principal user or system administrator would modify the set of attributes for this particular tenant entity at 600 Madison at the entity level. Specifically, they would change the "Authorize Service Request Below a Certain Cost Value" attribute value to "<$2,500.00". Since the User Profile set of attributes for this particular tenant office manager at 600 Madison has been modified, it will override the previously modified User Role Category set of attributes at the property level.

In a further extension of the above example, it is discovered that a particular tenant office manager, Sarah, needs the ability to authorize service requests that cost up to $3000.00 (but the other office managers for that same tenant are only authorized up to $2,500). To meet this requirement, the owner/property manager principal user or system administrator would modify the set of attributes for this particular tenant office manager user at 600 Madison at the user level. Specifically, they would change the "Authorize Service Request Below a Certain Cost Value" attribute value to "<$3000.00". Since the user profile for this particular user has been modified, it will override the previously modified User Role Category set of attributes (at the property level), the previously modified User Role Category set of attributes (at the entity level), and the original set of attributes defined for the general tenant office manager User Role Category.

The following lists the relationship between User Role Category, user role and user profile.

| User Profile (User level) Attributes -Names -Values | | UR Category (Entity Level) Attributes -Names -Values | | UR Category (Ppy Level) Attributes -Names -Values | | UR Category (Original Set) Attributes - -Values |
|---|---|---|---|---|---|---|
| | ← Overrides | | ← Overrides | | ← Overrides | |

The following set of rules is adopted:

The attribute set mapped to the User Profile overrides the attribute set of the User Role Category at the Entity Role Category level, which overrides the attribute set of the User Role Category at the Property Profile level, which overrides the original attribute set of the User Role Category.

A single user can have different User Role Categories but only one user profile at the same property.

A single user can have the same entity role, and the same User Role Category at different properties with the same or different attributes.

A single user cannot have different User Role Categories for the same Entity for multiple properties (since Entities are tied to the property). If the user needs different functionality at different properties, then the attribute to User Role Category mapping can be customized on an exception basis.

The following table sets forth several examples of this grouping and mapping process for several users as related to several properties.

TABLE 3

| User name | Property | Entity | Entity Role Category | User Role Category | Attributes |
|---|---|---|---|---|---|
| MaricaM | 600 Madison | Rubenco | Property Manager | PM_User_Role_A | Attribute Set 1 |
| MaricaM | 1 Dag | Rubenco | Property Manager | PM_User_Role_A | Attribute Set 1 |
| RichardR | 600 Madison | Rubenco | Owner | OW_User_Role_A | Attribute Set 2 |
| MaricaM | 600 Madison | Rubenco | Tenant | TN_User_Role_B | Attribute Set 3 |
| CamachoM | 1000 Fifth Avenue | Newark | Property Manager | PM_User_Role_A | Attribute Set 4 |

In the above, PM = property manager; OW = Owner and TN = Tenant.

IV. Service Module

Service Request. One of the features of the system is to enable certain authorized users of a property to initiate service requests to property owners or property managers using an Internet-based tool and a standard process. By integrating the Internet and wireless technology, the system facilitates the communication between the user at a property initiating a service request, on the one hand, such as a tenant, property owner or property manager, and, on the other hand, the vendor user(s) responsible for fulfilling the request. The system also enhances the overall experience associated with submitting a service request by providing point-in-time status on all service requests. Further, the system provides the property owner or property manager with the capability to associate costs and detail information to all service requests initiated and fulfilled within a property site.

A. Create or Update a Service Request. In using the system, there are various actions that initiate a service request, including any updates to existing service requests, the ability to view or print a service request, canceling an existing request and accessing completed/archived service requests. Preventative Maintenance requests (scheduled), include Ad Hoc service requests (requests created by the property engineering staff). Various types of service requests are shown in Table 4 below. In Table 4, a shared resource request is one that applies to a common service that can be used by all of the tenants of a building, like use of a freight elevator.

TABLE 4

| Type of Service Request | Service Request Description | Immediate Request | Shared Resource Request |
|---|---|---|---|
| 1. Lighting | Repair, adjustment or replacement of lighting fixtures or associated parts/materials | X | |
| 2. Comfort (Heat/Cool) | Temperature adjustment to specific areas of the building | X | |
| 3. Freight Elevator | Reserve the freight elevator | | X |
| 4. Building Conference Center | Reserve conference center space | | X |
| 5. Loading Dock | Reserve loading dock space | | X |

TABLE 4-continued

| Type of Service Request | Service Request Description | Immediate Request | Shared Resource Request |
|---|---|---|---|
| 6. HVAC OT | Designate time for air conditioning after normal business hours | | |
| 7. Electrical | Repair, adjustment or replacement of electrical parts/materials | X | |
| 8. Janitorial/Extra Cleaning | Specified cleaning other than scheduled cleaning service | X | |
| 9. Trash / Rubbish | Removal and/or disposal of trash other than scheduled pick up | X | |
| 10. Plumbing | Repair or replacement of plumbing parts/materials | X | |
| 11. Doors / Equipment | Install, repair, adjustment or replacement of building doors or building equipment | X | |
| 12. Security | New/cancelled security passes or specified security need | X | |
| 13. Restroom supplies | Repair or replacement of restroom supplies and/or equipment | X | |
| 14. Valet Parking | Car retrieval or specified need associated to building parking | X | |
| 15. Elevator Breakdown | Repair of elevator equipment | X | |
| 16. General Repair /Maintenance | Repair and maintenance requests that fall outside of the specified SR types | X | |
| 17. Preventative Maintenance (to come) | Recurring activities required for the maintenance of the building. (Weekly, Monthly, Annually, etc.) | Recurring | |
| 18. Other | All other requests that fall outside of the specified types | X | |

Within the set of attributes assigned to a user can be a set that includes the particular service requests that a user can originate. For example, the attribute set can include one such as:

SR_create_lighting meaning that the user can authorize a service request for lighting, shown as 1 in Table 4. The user can be given unrestricted access to authorize all types of service requests or on certain ones from the list of Table 4, or other types of service requests.

Service requests are sent, tracked, fulfilled and communicated in a web-based application. In the service request module, interactive documents are used and the functions achieved by creating or editing a document include:

1. Create a Service Request—an interactive document is displayed. The user making the request selects a type of service needed from a list similar to that above. A list of vendors that can perform the needed services is then displayed. The vendor is selected and the request is made and transmitted to the vendor over the Internet. The request indicates the dollar limit authorization of the person who made the request. The vendor can accept the request, reject it, or request modification. This can all be done via the Internet.

2. Update an existing Service Request—here the user making a request can:

Add additional information to an existing Service Request
Update the status or information specific to the completion of a Service Request (workflow system updates automatically)
Cancel an existing Service Request
3. View or Print a Service Request
an Existing Service Request
a Closed Service Request
4. Authorize a new Service Request
5. Request additional information on a Service Request
6. Delegate a Service Request (within Property Mgmt group)
Sign Off on a Service Request All of these are done by entering and editing data on an interactive document display screen.

B. Fulfillment Workflow. The system provides the owner or property manager with information regarding the fulfillment of such a requirement by a vendor. That is, the system provides a fulfillment of the workflow that includes all the actions within the system once a service request has been created or updated.

The system provides for the routing/assignment of a service request to the appropriate individuals (authorized users) for authorization and completion of actions required to fulfill the request. The request routed to a vendor includes the business rules (such as time of completion work to be performed) and routing logic for the requester to the vendors (user) completing the request.

An authorized user at the vendor entity enters data into the system indicating the status of the work request. For example, the vendor user with the proper authorization (attribute) can enter when the job was started and its current status if interim reports are required. When completed, this information also is entered and, if needed, the price charged indicated. All of this information is transmitted, primarily and preferably over the Internet, to the database of the property for which the service was performed. It is available for review by the property owner or property manager. Price information charged to fulfill the service request can be copied to a data file to provide a running total of the charges made to a tenant or property. The property owner can monitor cost outlays for the property. This is done by the appropriate user of the entity having the proper attributes (assigned attributes). Typical, exemplary attributes would be:

Sr_view_inspection
Sr_view_cost_estimate
Sr_create_cost_estimate
Sr_prioritize
Sr_can approve_estimate
Sr_can accept
Sr_can complete There are sub-components of the process for making and completing a service request. Depending on the variability of the request, some actions associated to sub-components of the workflow process may be skipped. The defined business rules drive these processes. The integration of other communication tools to support the completion of a service request and meet the primary objectives of the system service request process include the use of e-mail, wireless devices and other tools that can be used to supplement the overall process of making and fulfilling a service request.

V. Building Operations Module

The objective of the Building Operations module is to benefit the Property Management user constituency, by providing a centralized, easy to use process that coordinates and automates the tasks surrounding the maintenance and monitoring activities for the property. The Building Operations module serves as a hub for coordinating:

Building Preventative Maintenance activities. There are scheduled, recurring activities, that are necessary to maintain the physical building, including it's facilities, equipment, grounds, amenities, and systems. The workflow and physical tasks required to execute these activities mirror those of standard service requests, except for the initiation process. While a standard service request is initiated by a system user, preventative maintenance activities are triggered by a prompt from a Preventative Maintenance Activity Profile. These requests or reminders are automatically generated and transmitted to the appropriate vendor. Profiles are set up by the property management staff (most likely the property Chief Engineer) to define the maintenance activity, the individual responsible for performing the activity, the time that the activity should be performed, the frequency of execution, and the prompting method.

Building Monitoring activities. Monitoring activities are similar to the preventative maintenance activities, except that the equipment and meter readings are monitored and recorded, instead of maintenance activities being executed.

Automated Logs. The system includes automated logs to track property management personnel activities, equipment status, Fire Warden items, violations, etc.

For example, an owner/manager/tenant entity authorized user can contact a selected vendor to check availability of staff to perform a service request and/or to assign the job. In other cases, the user may wish to contact all of the vendors at the same time if, for example, the user wanted to post a request for bids on a job or availability for emergency job performance, or to provide general information. A vendor can acknowledge acceptance or rejection of a job, communicate to negotiate price information, etc., by accessing the system over the Internet.

Automated updates to the building security system regarding changes in building residents.

BACKGROUND: Frequently, the list of authorized people who have access to a building becomes obsolete. In order to update the list, the property owner or property manager may decide to cancel all access badges and reissue them. This process is both inconvenient to the tenants and costly to the owner.

The system can create an automated tenant log that can be compared to the security roster. This log can be seamlessly integrated into the building security system.

The data from the log can be used to build a confirmation process from security of the building to the tenant office manager. The process would check on expiring building passes to verify if they are still valid. If the tenant office manager fails to confirm the validity of the building pass, security can cancel the pass. This process would reduce cost for the property owner and be less inconvenient for the tenant.

Automated Vacancy Credit Notification and Report

BACKGROUND: Owners enter into a contract with a cleaning company to clean the whole building (@ approx. $2/foot). The cleaning company and owner sign a contract, and provide a cleaning specification. The contract contains a vacancy credit provision, meaning the building gets money back for spaces not cleaned (e.g. when a tenant moves out).

The system sets up an automatic method of providing notice to the cleaning company when tenants are leaving the building (potentially 30 days advance notice). By establishing a record of the notice, the cleaning company cannot later claim they were not told about the vacancy and charge the property owner for unnecessary services. The system can also create and send a vacancy credit report each month to the property owner, property manager and vendor. This feature helps maximize revenue for the owner by ensuring that the appropriate monthly vacancy credit is applied.

Automated Insurance Certificate Expiration Tracking and Reminders

Insurance certificates usually must be maintained for all tenants and vendors who come into the building. These certificates are required before vendors can proceed with a job and before tenants can move into a building. Keeping track of the certificates can be a difficult and time-consuming task in a large office building and yet it is vital from a risk perspective that all certificates are current. Using the system, a log/reminder is set up to track each tenant and vendor's insurance certificate. This makes it easier for the property owner or property manager to track the validity of the insurance certificates and helps reduce the risk of having a tenant or vendor working in the building without a valid insurance certificate. The insurance certificates can be maintained at static or interactive documents.

Communications—since all properties are connected to the Internet, there can be announcement and messaging functions to facilitate communication among the different users of the system.

Making announcements affords property managers and owners the ability to "publish" a public announcement to all users of the system at a specific property location. A one to two line announcement summary will appear on key screens of the user interface. Users can then click to access detailed information provided in the announcement.

Specific functionality for the announcement feature includes:

Viewing, Creating, Saving Draft, Deleting Draft, Publishing, Expiring,

Filing and Publishing via e-mail.

Sending messages allows system users the ability to create, send and track messages to other system users and/or to individuals and companies who do not use the system. Specific functionality for messaging includes:

Creating

Viewing

Sending

Deleting

Saving Draft

Audit Trail

Categorizing

Ability to use dynamically created address lists from the system, based on the users role category.

In addition to the above features, all system participants can add, edit, and delete private e-mail addresses.

Customer Service—Includes functions to facilitate communication with the system administrator, who can be an outside vendor, and the ability for all users to provide feedback on the system.

VI. System

Figure 1A:
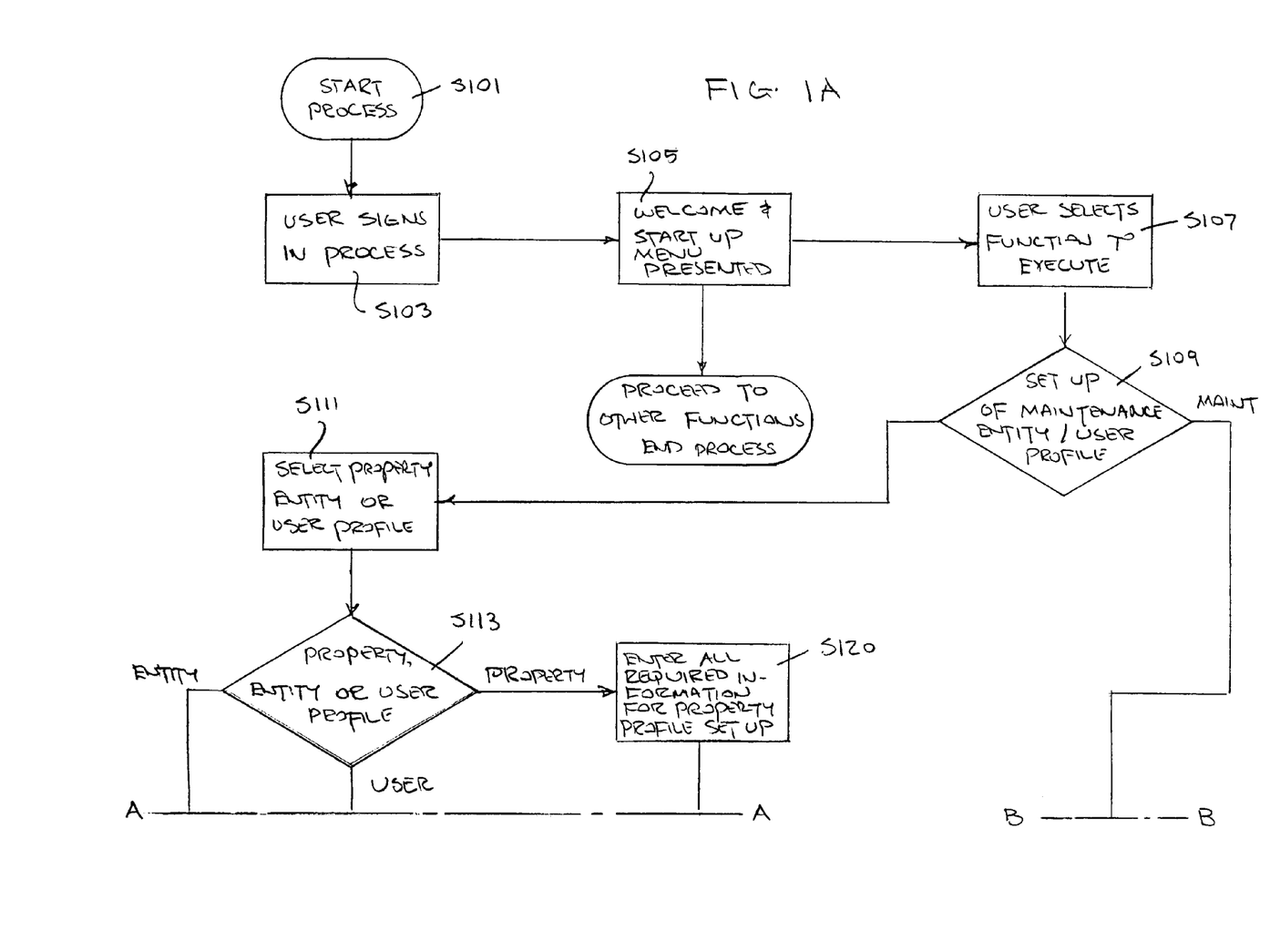
FIG. 1 is a flow chart showing the set up and flow of data in the system.
Figure 1B:
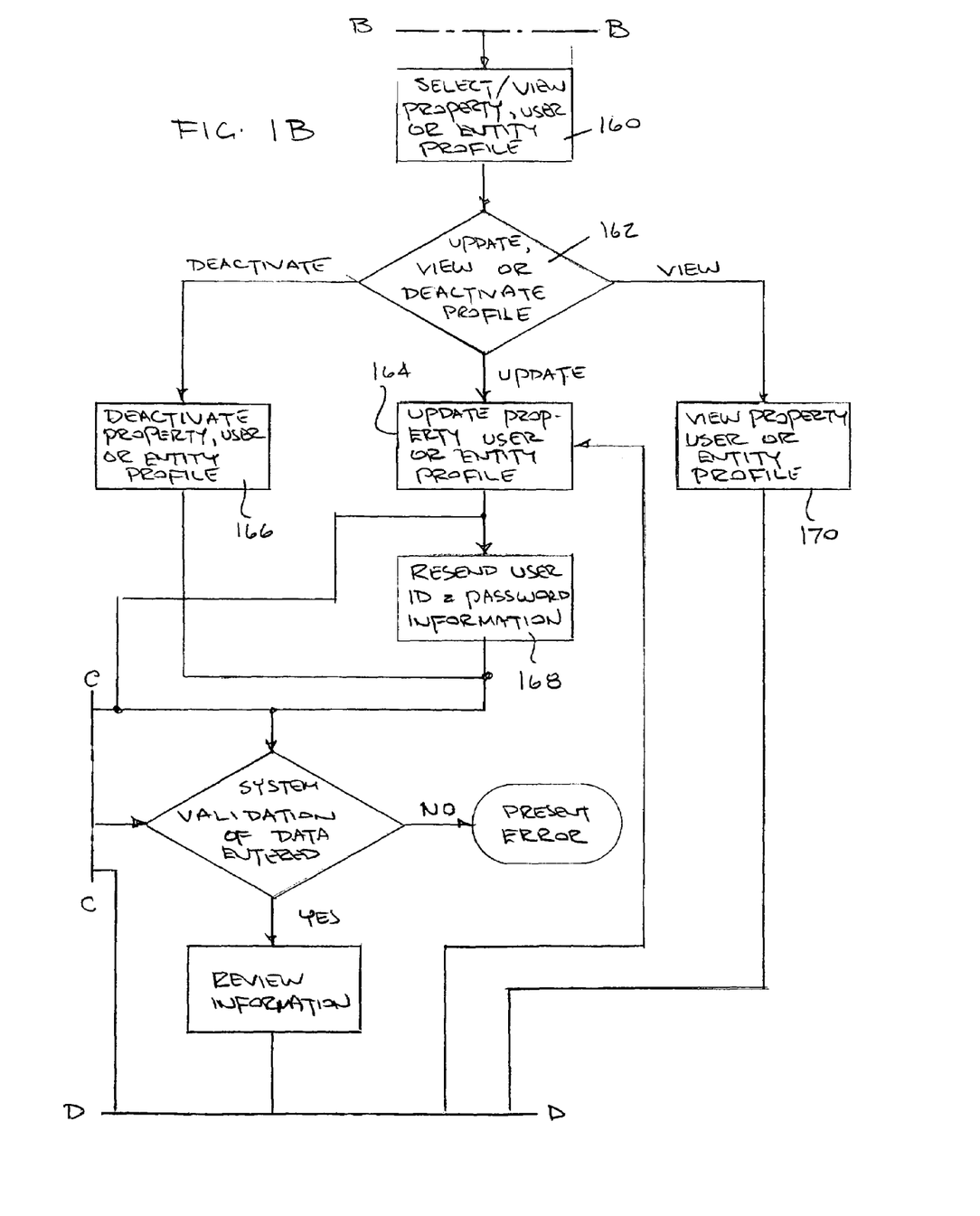
Figure 1C:
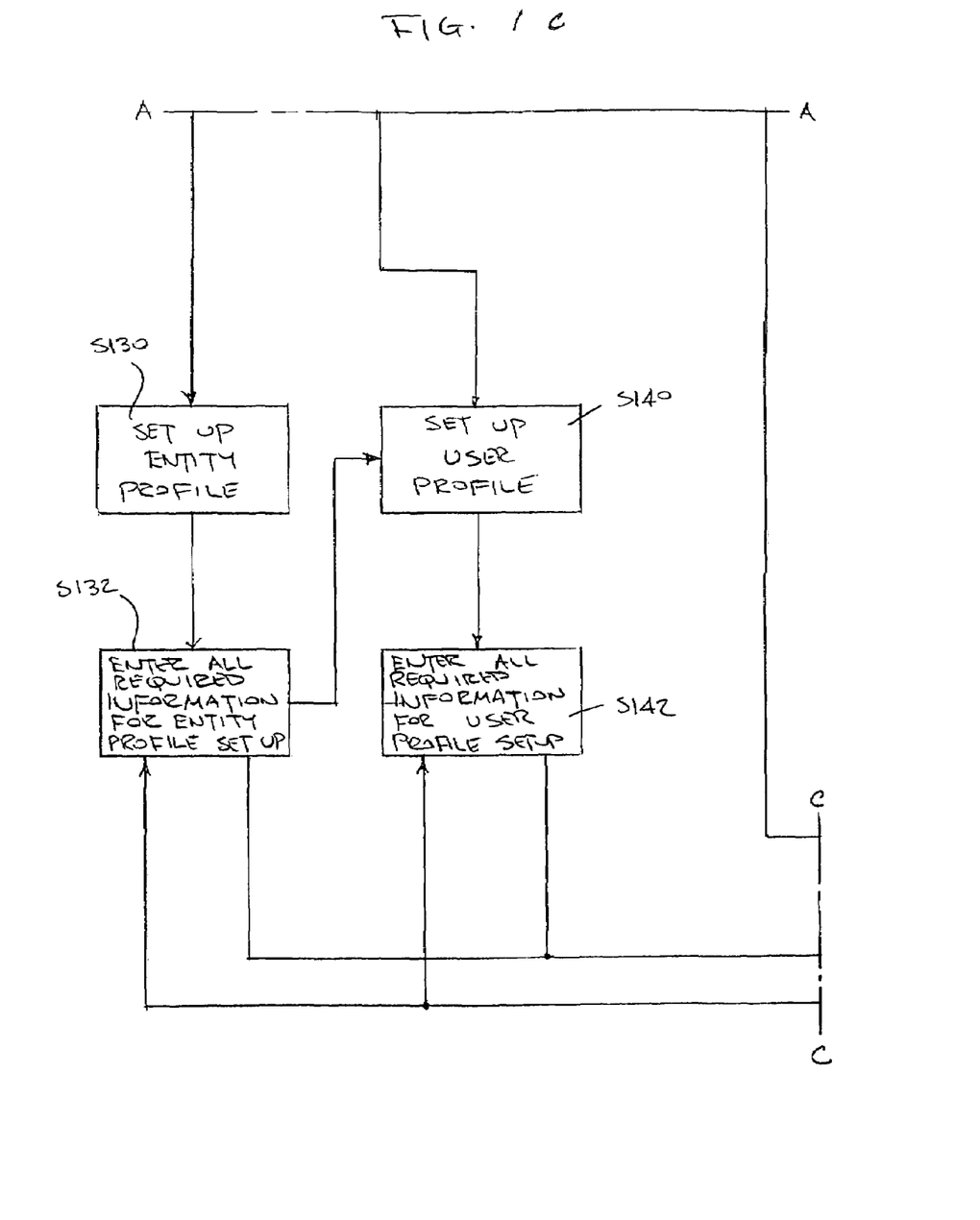
Figure 1D:
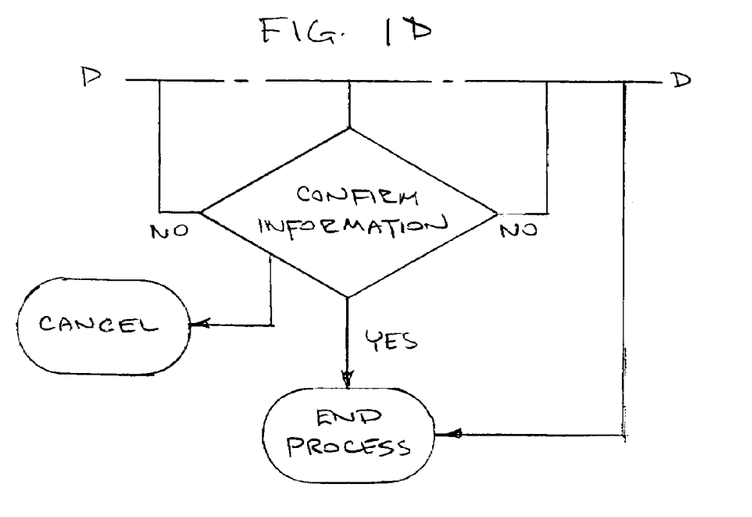
Figure 2:
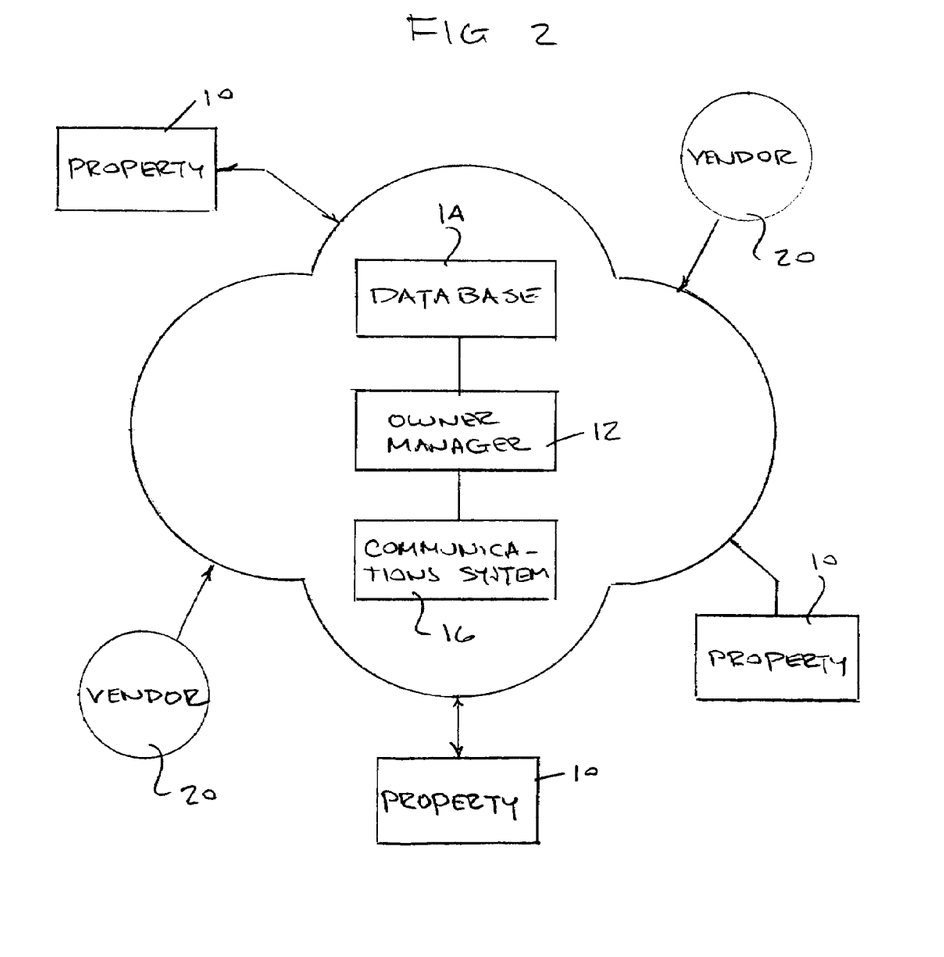
FIG. 2 is a diagram showing the communications in the system for a standard service request.

Communication. FIG. 2 is a schematic block diagram illustrating the communication aspect of the system. Each of the blocks 10 represents a property that is enrolled in the system. As explained above, each such property has an Internet domain name. Block 12 represents the landlord or property manager who can be on the premises of an enrolled property 10 or at a remote location. In the embodiment described in FIG. 2, it is assumed that the same owner entity owns, or the same property manager entity manages, a number of properties 10. The method and system can be applied to a single property.

There is a computer database 14. This can be at the site of the property owner/manager of an enrolled property or there can be a database at each property 10. The database, using any suitable conventional database management technique, stores all of the data previously referred to.

The system has a communications system 16, preferably the Internet. The communication link is multi-directional so that there is communication between each property and its owner, between properties, between users at a property and vendors, etc. As explained above, each property has a domain name and is connected to the Internet, thus providing universal communication between those using the system.

Reference numeral 20 indicates various outside vendors, such as repair and supply vendors who also have communication with the owner/manager 12 and any of the properties. The vendors each can have a domain name and be accessible over the Internet. Alternatively, a vendor can be accessible to a user of the system such as by e-mail or telephone. There is bi-directional communication between the property owner/manager, tenant entities and the vendors.

The authorized associate with a property, which can be a user of a property owner/manager or tenant, contacts the vendor 20 on a universal or selected basis. The vendor is provided access to the database 14 on a selective basis to view certain documents, such as property rules, drawings, etc.

Specific features of the invention are shown in one or more of the drawings for convenience only, as each feature may be combined with other features in accordance with the invention. Alternative embodiments will be recognized by those skilled in the art and are intended to be included within the scope of the claims. All patent applications, patents, patent publications, and literature references cited in this specification are hereby incorporated by reference in their entirety. In the case of inconsistencies, the present description, including definitions, is intended to control. Accordingly, the above description should be construed as illustrating and not limiting the scope of the invention. All such obvious changes and modifications are within the patented scope of the appended claims.

We claim:

1. A method of managing a real estate property comprising the steps of:
   setting in a computer database lease parameters of at least one tenant entity located in the property, at least one user profile for the tenant entity and for a property manager entity related to management of the property;
   establishing in said computer database at least one vendor entity and service performed by said at least one vendor entity for the property;
   assigning in said computer database attributes of authority of a user of at least one of said tenant entity and said property management entity relative to at least one requesting a service for the property;
   a said user of said at least one tenant entity or property manager entity making a request for a service to be rendered for the property,
   verifying the attribute of authority of the user requesting the service to be rendered for the property,
   displaying a list of vendors from said computer database that can perform the needed service,
   selecting a vendor from the list,
   routing to the selected vendor the request for the service,
   the vendor to whom the request was routed communicating the status of fulfillment of the request to said database,
   maintaining status of fulfillment of the service request; and
   providing communication of the status to the entity requesting the service.

2. The method of claim 1 further comprising setting in said database a user profile of an owner entity related to the property, and assigning at least one attribute of authority to said user of said owner entity.

3. The method of claim 2 wherein there is at least one user for each of the owner entity, property manager entity and tenant entity.

4. The method of claim 2 wherein in the setting step one person is set in the database as a user in two or more of the entities.

5. The method of claim 2 wherein there are a plurality of properties owned by an owner entity having lease parameters established in said computer database.

6. The method of claim 5 wherein a said plurality of said properties owned by an owner entity are managed by the same property manager entity.

7. The method of claim 2 wherein in the setting step a principal user of an entity is assigned the attribute of authority of being able to assign or change the attributes of authority of another user of the same said entity.

8. The method of claim 7 further comprising the sep of setting in said database a user profile of a system administrator entity and assigning a user of the system administrator entity the attribute of authority to change the attribute of authority of a user of a tenant entity of the property.

9. The method of claim 1 further comprising the step of providing communication capability between users of the property manager entity, tenant entity and vendor entity.

10. The method of claim 9 wherein the step of providing communication capability comprises establishing Internet access for all of the entities.

11. The method of claim 10 further comprising the step assigning an attribute of authority to the user of a vendor entity.

12. The method of claim 11 wherein the step of maintaining the status comprises a user of the vendor entity entering in said computer database the status of the fulfillment of the service request and communicating the status to the user of the entity requesting the service.

13. The method of claim 12 wherein the status of the fulfillment of the service request is communicated to the property manager entity of the property.

14. The method of claim 9 wherein the vendor entity to whom the request is touted enters the status of fulfillment of the request into said database that is available to the user of the entity requesting the service.

15. The method of claim 1 wherein an attribute of authority comprises a limit of monetary expenditure in making a service request.

16. The method of claim 1 further comprising the steps of:
assigning an Internet domain name to the property; and
accessing the data in said database over the Internet.

17. The method of claim 16 further comprising the steps of setting in a said computer database data of an owner entity of each of the plurality of properties, data of a property manager of each of the plurality of properties, and data as to at least one tenant entity that occupies space in each of the plurality of properties.

18. The method of claim 17 wherein the step of setting sets in said database a user profile for at least one user of at least one of the owner entity, the property manager entity, vendor entity and the tenant entity for each of the plurality of properties, and assigning at least one attribute of authority to each said user.

19. The method of claim 1 wherein the property manager entity and a vendor entity communicate by wireless.

20. The method of claim 1 wherein a user of a tenant entity makes the request for a service and the request is routed by the tenant entity to a vendor entity.

21. The method of claim 1 wherein a user of a tenant entity makes the request for a service to the property manager entity who in turn routes the request for service to a vendor entity.

22. The method of claim 1 wherein a property manager entity makes the request for a service directly to a vendor entity.

23. The method of claim 1 further comprising the step of programming a computer with scheduled requests for service;
the computer generating the requests; and
routing the request to a vendor entity.

24. The method of claim 1, further comprising the step of establishing a list of services available for the property in said computer database and attributing work processes and business rules to the various services of the list.

25. The method of claim 1 wherein the property is an office building.

26. The method of claim 1 wherein the vendor entity to whom the request is routed enters the status of fulfillment of the request into said database that is available to the use of the entity requesting the service.

* * * * *